Jan. 18, 1927.
W. A. BEIMLING
GASOLINE LOCOMOTIVE
Filed August 1, 1924
1,614,452
8 Sheets-Sheet 4
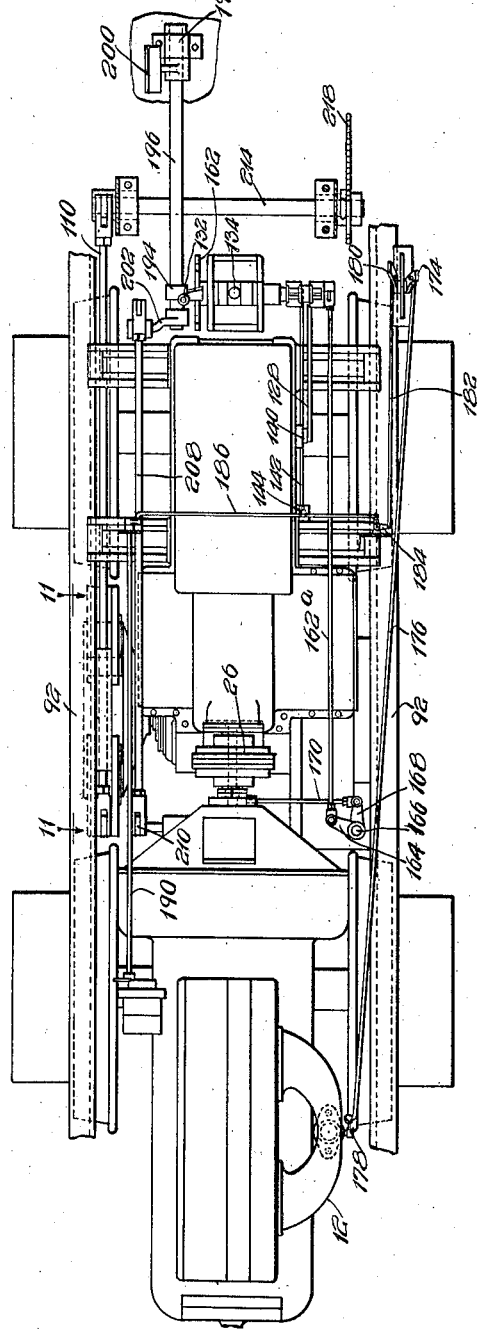

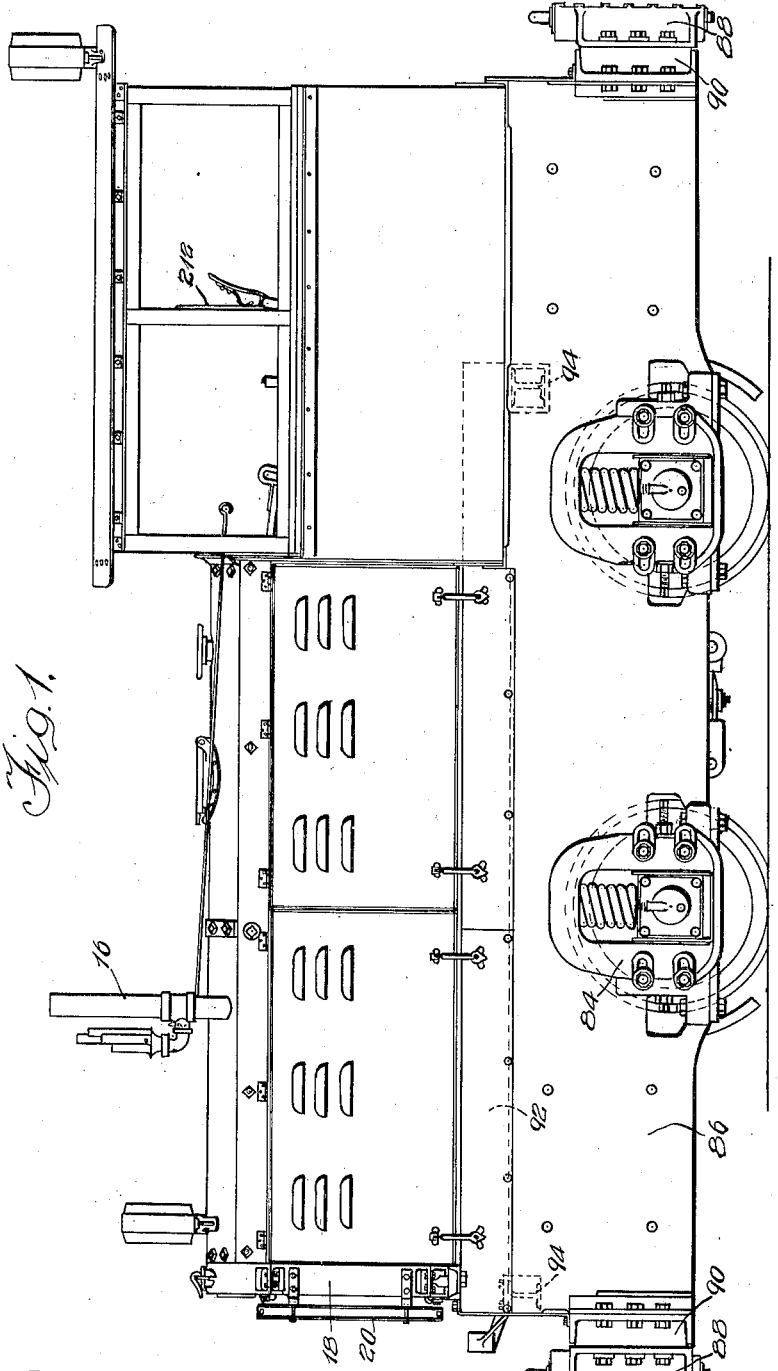

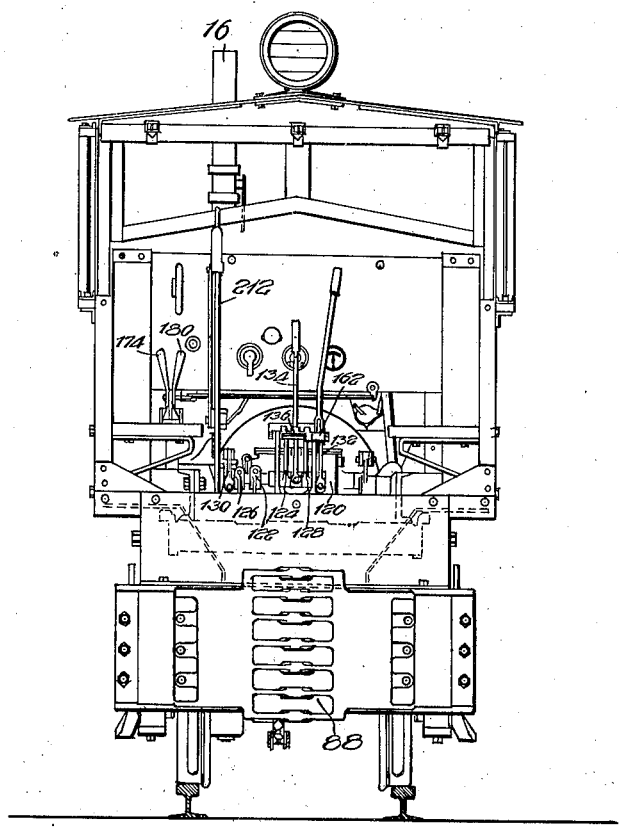

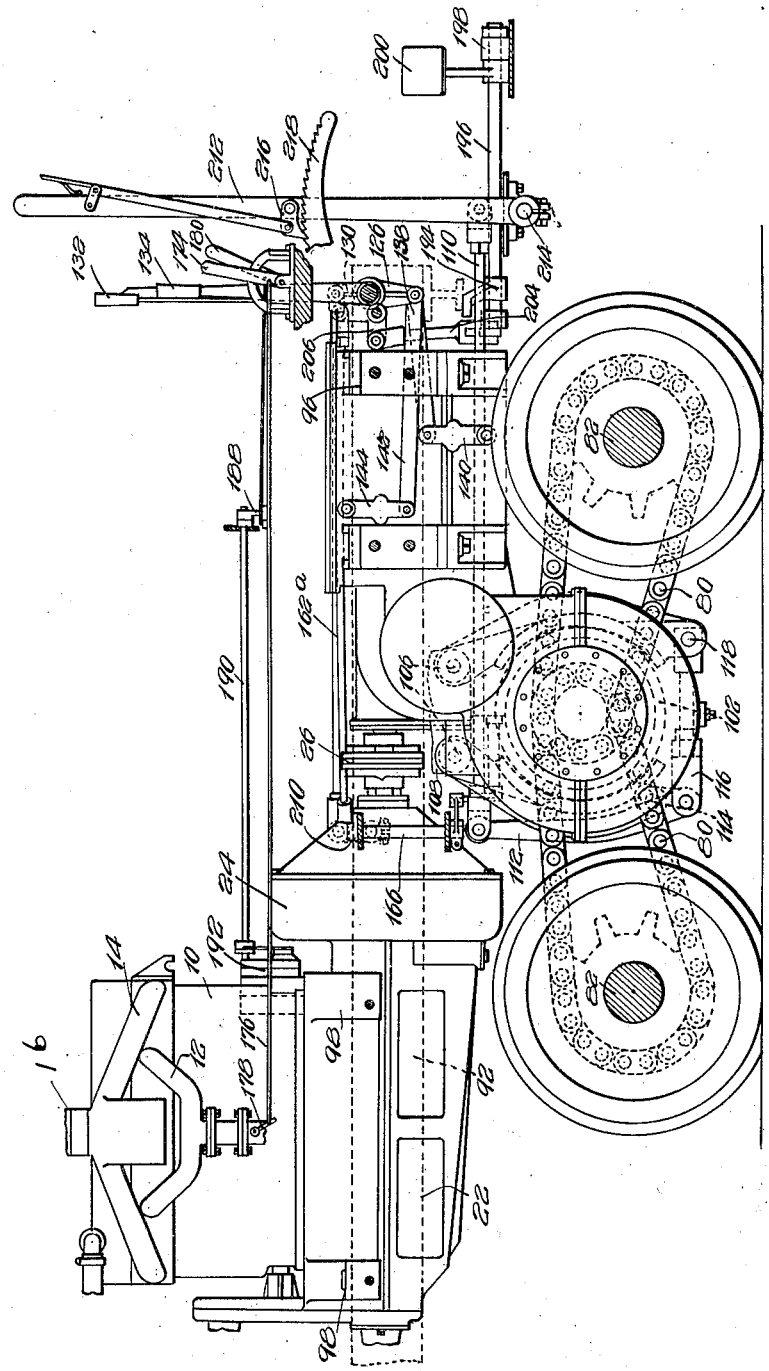

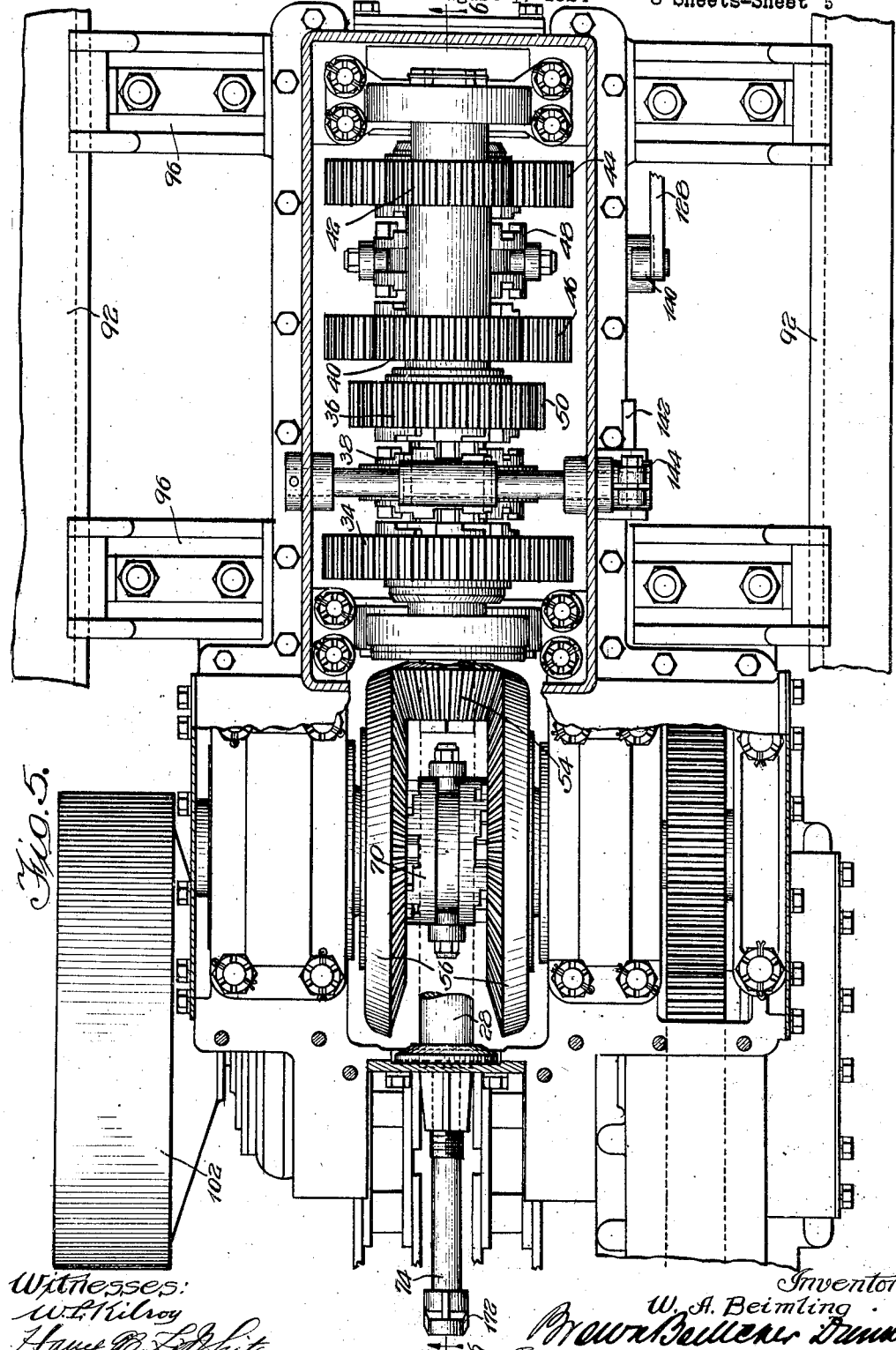

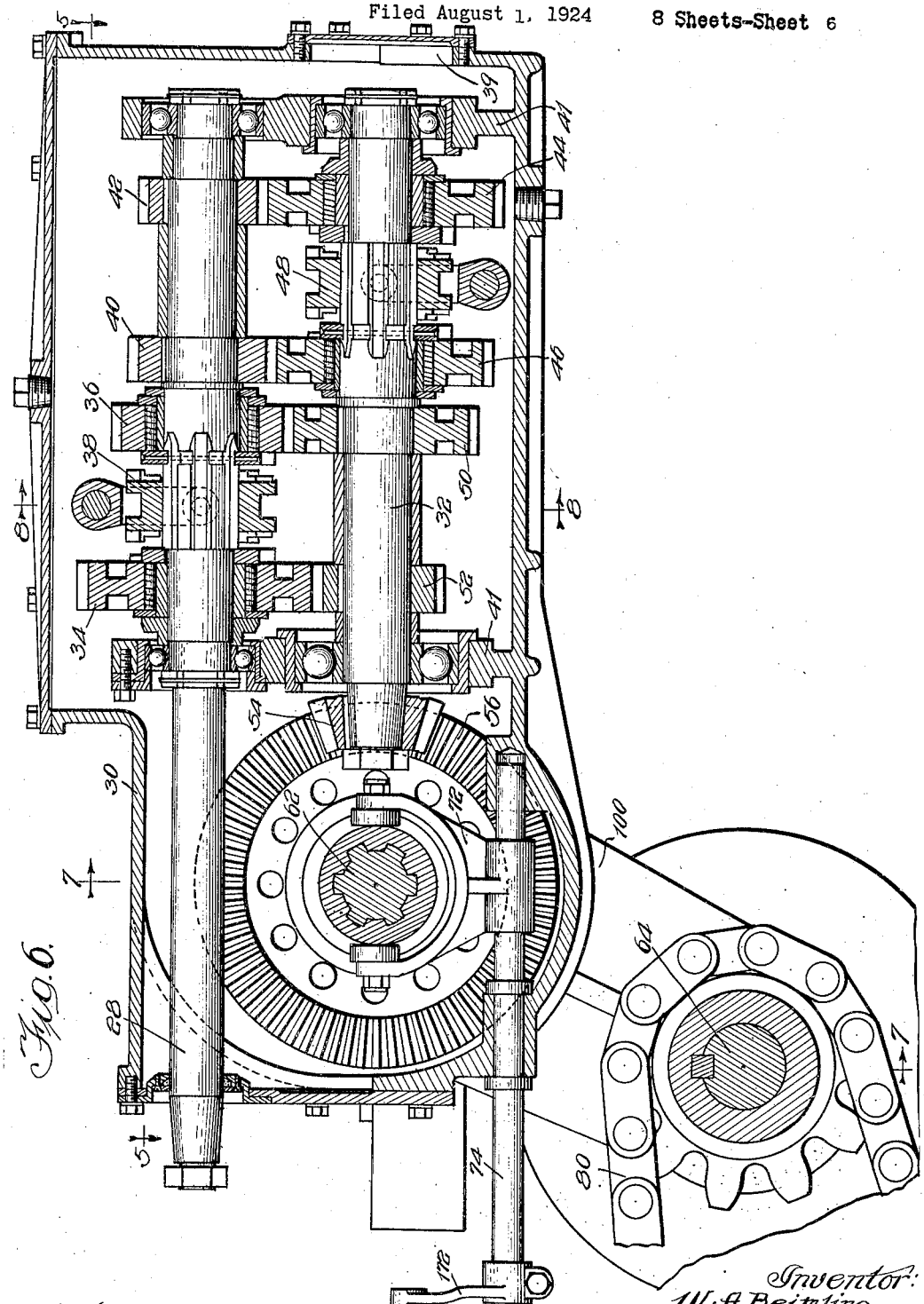

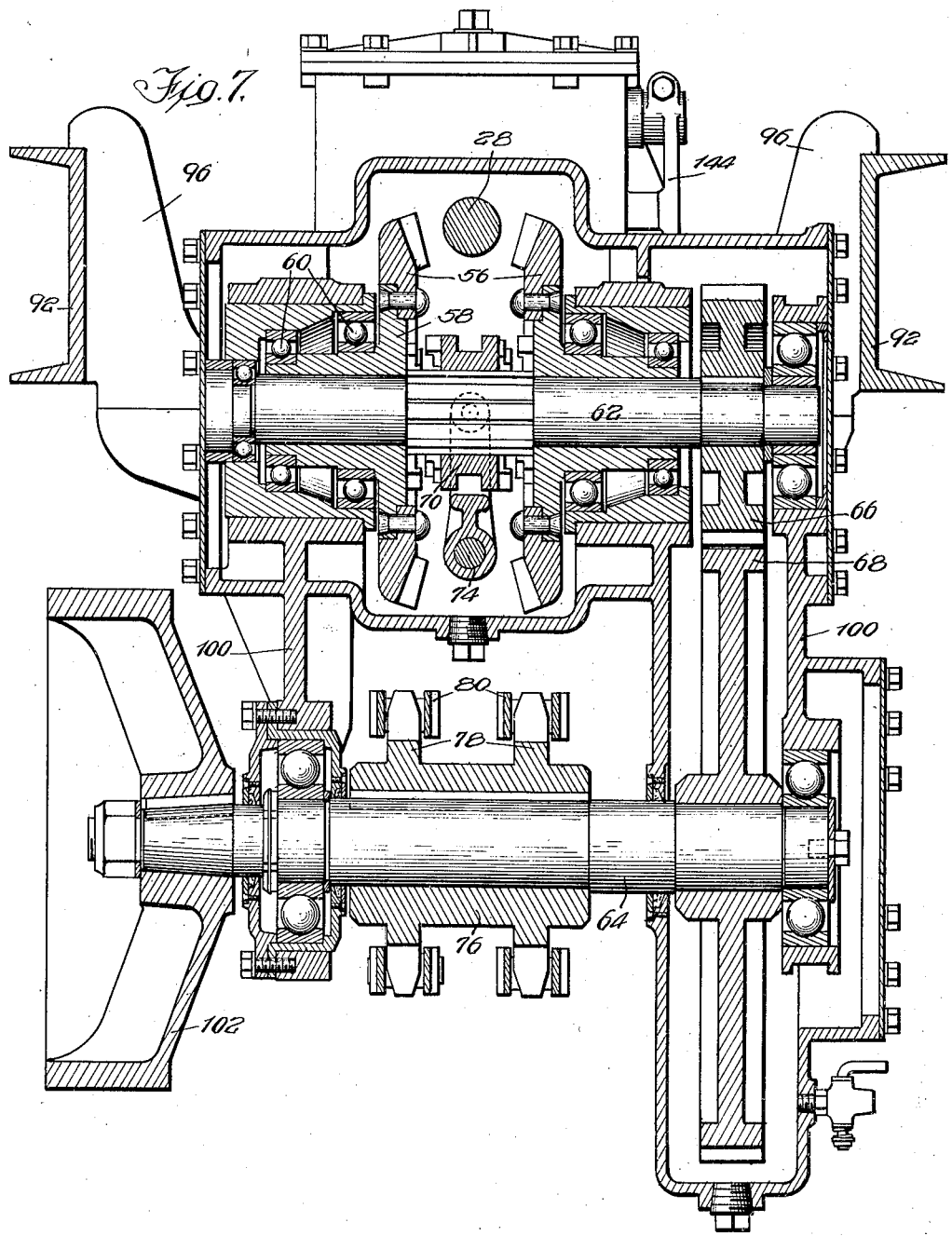

Jan. 18, 1927.  
W. A. BEIMLING  
GASOLINE LOCOMOTIVE  
Filed August 1, 1924    8 Sheets-Sheet 8
1,614,452
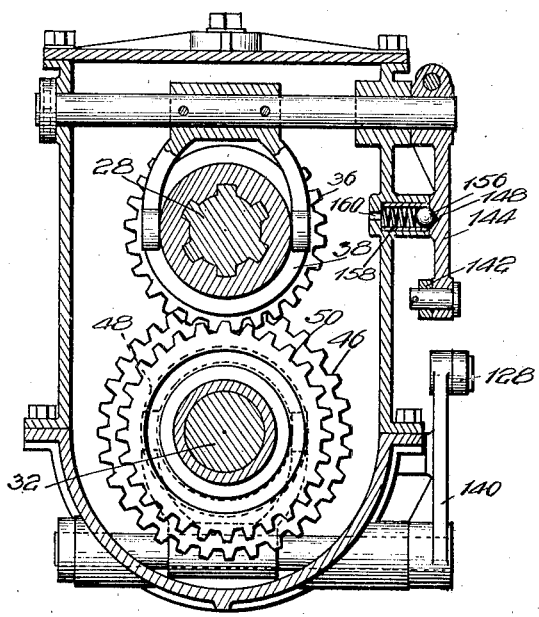
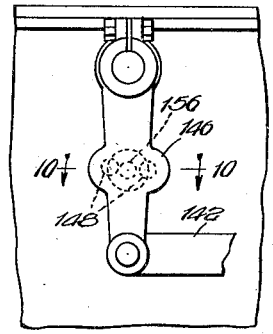
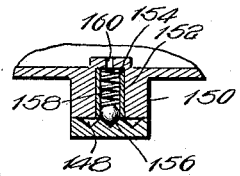
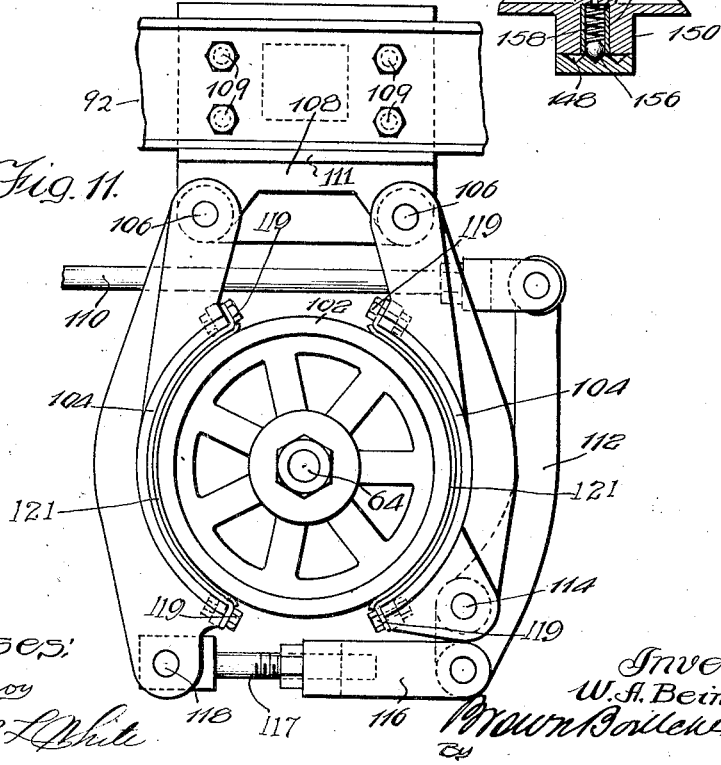

Patented Jan. 18, 1927.

1,614,452

UNITED STATES PATENT OFFICE.

WILLIAM A. BEIMLING, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

GASOLINE LOCOMOTIVE.

Application filed August 1, 1924. Serial No. 729,481.

My invention relates to motor vehicles, and more specifically to an improvement in vehicle construction particularly useful in connection with small locomotives equipped with internal combustion power plants.

Among the primary objects and advantages of the invention are first, a brake construction improved both as to operation, and convenience and accessibility for adjustment and repair; second, compactness, both generally and more particularly in connection with the construction of units of unusually small overall dimensions; and third, features of alignment and convenient installation on the running frame.

In the accompanying drawings:—

Fig. 1 is a side and Fig. 2 an end elevation of a locomotive embodying one form of the invention;

Fig. 3 is a side elevation of the power plant and transmission, part of the subframe being indicated in dotted lines;

Fig. 4 is a plan view of the power plant and transmission, including the control mechanisms;

Fig. 5 is a plan view of the transmission proper, with parts broken away to show the change speed and reversing mechanisms;

Fig. 6 is a vertical central section substantially on line 6—6 of Fig. 5;

Fig. 7 is a transverse section on the irregular plane indicated by line 7—7 of Fig. 6;

Fig. 8 is a detail section on line 8—8 of Fig. 6;

Fig. 9 is an enlarged detail of one of the gear shift levers illustrated in Fig. 8;

Fig. 10 is a detail section on line 10—10 of Fig. 9; and

Fig. 11 is an enlarged side elevation of the brake, substantially on line 11—11 of Fig. 4.

Power plant.

The power plant illustrated is an ordinary internal combustion engine 10, having the inlet manifold 12 and exhaust manifold 14 discharging upwardly through stack 16. The radiator 18 is preferably provided with a protecting grille 20.

To the rear of the crank case 22 is the usual clutch housing 24 containing the manually controlled friction clutch used to disconnect the motor from the transmission. Back of clutch 24 is a coupling 26 transmitting power to the upper longitudinal shaft 28 in the gear shift casing 30.

Transmission.

The gears in casing 30 are arranged in the reverse of the customary order, the change speed gears being at the rear end of the casing, and the power being delivered finally from the front end. For locomotive service, no differential is necessary, and it is advisable to provide four different speeds in each direction. Accordingly, power may be transmitted from shaft 28 to the lower shaft 32 through any one of four sets of spur gears. Shaft 28 carries gears 34 and 36 rotatable, but non-slidable thereon, and a splined clutch 38 shiftable to clutch either of said gears to the shaft. It also carries fixed gears 40 to 42 keyed on the shaft. Similarly, shaft 32 carries rotatable, but non-slidable gears 44 and 46 meshing with gears 40 and 42, respectively, and splined clutch 48 for connecting either gear 44 or 46 to the shaft. It also carries fixed gears 50 and 52 meshing with gears 36 and 34, and keyed on shaft 32. It will be obvious that clutches 38 and 48 may be employed to connect shaft 28 to shaft 32 at any one of four different speed ratios. Shaft 28 may be withdrawn forwardly through a suitable opening and shaft 32 rearwardly through opening 39 (Fig. 6). Both shafts have bearings close to the gears in integral webs 41.

The front end of shaft 32 terminates rearwardly of the front end of shaft 28, and carries a bevel pinion 54 constantly in mesh with each of two bevel gears 56 carried by sleeves 58, each supported by double ball bearings 60. Power delivery is through transverse shaft 62 to jack shaft 64 by means of spur gears 66 and 68, the connection between either bevel gear 56 and shaft 62 being established by splined clutch 70 controlled by yoke 72 on shaft 74.

Referring to Figs. 3 and 6, it will be noted that jack shaft 64 is located below and in front of transverse shaft 62 substantially midway of the combined length of the power plant and transmission above it. The jack shaft carries a keyed sleeve 76 having double sprockets 78 formed thereon, from which drive chains 80 run to the axles 82. It will be noted that the central location of the jack shaft, not only shortens the overall length of the entire power plant, but houses the jack shaft between the axles 82, and locates the power plant centrally above the running gear.

Brake.

Jack shaft 64 is journaled in webs 100 integral with casing 30 and carries a brake drum 102 rotating between brake shoes 104, both pivoted on pivots 106 at the corners of a bracket 108 carried by the channels 92. Bracket 108 is bolted at 109 to channels 92 and has a stiffening rib 111 which also underlies the lower flange of the channel. Application of the brake is by means of pull rod 110 operating on lever 112 pivoted to one brake shoe at 114 and at its end to clevis 116 having threaded connection with tension rod 117 pivoted to the end of the opposite shoe at 118. It will be noted that this construction does not necessitate any alignment or precise positioning of bracket 108 with respect to shaft 64, and that the only effective lateral force developed on shaft 64 during braking, is the relatively slight one due to the pull on rod 110. Thus, in the particular design shown the force of 100 pounds applied to rod 110 develops a tension of about 500 pounds in rod 117 which will generate a pressure not much less than 1000 pounds on each of the brake shoes 104. The total load effective on the surface of the drum 102 will be about 2000 pounds, but it develops a balanced torque in shaft 64. The 100 pound tension in shaft 110 tends to swing the entire floating brake linkage about pivots 106 and this must be prevented by shaft 64.

Referring to Fig. 3 it will be noted that the driving forces of chains 80 are also always substantially balanced. When the upper reach of the rear chain is loaded, the lower reach of the front chain carries a substantially equal load, and vice versa.

In addition to the advantages of operation just mentioned, the construction shown is unusually convenient from the standpoint of maintenance. Referring to Figs. 3 and 11, it will be noted first, that tension rod 117 and clevis 116 are midway between the wheels in an easily accessible position. This is where the most frequent service adjustment to compensate for wear will be made. Second, by merely relieving the brake and taking out the holding bolts 119, friction facings 121 can be slipped out axially and replaced. These facings wear out from time to time, and it is a material advantage to be able to remove them without dismantling the brake mechanism. Third, removal of pins 106 only will drop the entire brake and its operating means for replacement. Fourth, drum 102 is directly accessible and can be taken off the end of shaft 64 and replaced without any troublesome interference by other parts. And fifth, as a measure of safety, a stone or timber encountering the lower end of lever 112 would tend to relieve the brake and the force of impact would not be multiplied by the linkage. Rod 110 and the upper end of lever 112, being the most vulnerable parts from this point of view, are well up under channel 92 where the risk of striking débris or other obstacles, is a minimum.

Main and sub-frames.

The axles 82 are carried in the usual spring guides 84 in the longitudinal beams 86 of a main frame provided at its ends with couplings 88 mounted on wooden pads 90 to cushion the shock of coupling and uncoupling. This main frame may be a typical standard unit of railroad stock. A sub-frame built up of longitudinal channels 92 laid over end cross beams 94 of I-section, receives hangers 96 supporting casing 30, and engages the lateral hooks 98 on the engine casting by means of which it is supported. The controls for the gear shifts and the engine are all supported by the sub-frame. A U-shaped bracket 120 is carried by the rear cross piece 94, and supports an outer sleeve carrying the shifting arm 122 and the control arm 124, an inner sleeve carrying the shifting arm 126 and the control arm 128, and a central sleeve carrying the shifting arm 130 and the forward and reverse lever 132. Between arms 124 and 128 is the usual sleeve providing a transverse pivot for the gear shift control lever 134 passing through the usual plate 136 with an H-shaped slot therein. Arm 126 actuates link 138 connected to arm 140 controlling clutch 48 through the usual shaft and yoke. Similarly arm 122 operates through link 142 and arm 144 to control the other clutch 38. The three position stops for the clutches 38 and 48 are mounted directly on casing 30, which is a convenience when casing 30 and its contents are in the repair shop for overhauling and adjustment. Thus each arm 140 and 142 is enlarged at 146 to accommodate three conical pits 148 moving over a boss 150 on the side of casing 30. Bore 152 receives sleeve 154, which is a snug fit on ball 156 urged outwardly by coil spring 158. A bore 160 provides for the access of lubricant inside the casing to lubricate spring 158, and the fit between ball 156 and sleeve 154 prevents loss of oil. Reverse lever 132 carries the usual thumb pressed pawl to engage in notches in a sector 162 straddled by said lever. The upwardly extending arm 130 actuated thereby, is connnected to longitudinal rod 162ª (see Fig. 3), running to arm 164, (see Fig. 4), on vertical shaft 166, which shaft carries arm 168 at its lower end. From arm 168 transverse link 170 extends in to connect with arm 172 (see Fig. 6), on shaft 74 for actuating yoke 72.

Suitable connections for the throttle and spark timing of the power plant are provided. I have illustrated throttle control lever 174 (see Figs. 3 and 4), from which rod 176 runs directly to the throttle lever 178. Beside the throttle control is the spark control lever 180 operating through longitudinal rod 182, bell crank lever 184, transverse link 186 and arm 188 to rotate rod 190 and control the adjustment of the timer 192.

The clutch control, and the brake lever are not carried by the sub-frame; the former because convenience of the operator requires it to be positioned a considerable distance to the rear of the end of the sub-frame, and the latter partly for the same reason and partly because no precise adjustment of the actuating means for rod 110 with respect to the rest of the mechanism carried by the sub-frame is ever required. Thus the sub-frame carries a depending bracket 194 guiding the front end of a rotating shaft 196 journaled at its rear end at 198 on the main frame, and carrying the clutch foot pedal 200. Arm 202 on shaft 196 actuates link 204, bell crank lever 206 carried by the sub-frame, link 208 and the clutch control arm 210. Brake lever 212 is pivoted at 214 on the main frame, and carries a spring pressed pawl 216 riding over a ratchet sector 218, carried by the sub-frame. Rod 110 is connected directly to lever 212. In separating the sub-frame from the main frame, it is only necessary to disconnect chains 80, rod 110, slip arm 202 off shaft 196, and slide the shaft rearwardly out of bracket 194.

Without further elaboration, the foregoing will so fully explain the gist of my invention, that others may, by applying current knowledge, readily adapt the same for use under varying conditions of service, without eliminating certain features which may properly be said to constitute the essential items of novelty involved, which items are intended to be defined and secured to me by the following claims.

I claim:—

1. In a device of the class described, in combination, front and rear axles and wheels, a jack shaft intermediate said axles with its end accessible between the wheels, a brake drum on said end, and a floating brake linkage detachably supported from above said drum, said linkage also being accessible between said wheels, said linkage including a single tension link adjustable to compensate for wear extending across the bottom of the linkage between the lower ends of the brake shoes in substantially the plane of the drum.

2. In a device of the class described, in combination, spaced axles, a jack shaft between said axles, drive chains running to the central part of both axles from the central part of said jack shaft, a brake drum on one end of said shaft, and means for applying substantially balanced braking forces to said drum, comprising shoes on opposite sides thereof, the ends of said shoes being pivoted for independent rotation on one side of said drum.

3. In a device of the class described, in combination, spaced axles, a jack shaft between said axles, drive chains running to the central part of both axles from the central part of said jack shaft, a brake drum on one end of said shaft, and means for applying substantially balanced braking forces to said drum, comprising shoes on opposite sides thereof.

4. In a device of the class described, in combination, spaced axles, a jack shaft between said axles, drive chains running to the central part of both axles from the central part of said jack shaft whereby the driving loads on said chains produce torque in said shaft substantially free from bending load, a brake drum on one end of said shaft, and means for applying substantially balanced braking forces to said drum.

5. In a device of the class described, in combination, a power plant, a clutch, a change speed transmission, a transverse drive shaft driven by said transmission and located longitudinally between said transmission and said clutch, a second transverse shaft below said first transverse shaft, drive connections between said second and first transverse shafts, a brake drum on said second shaft, and a floating brake linkage detachably supported above said drum.

6. In a device of the class described, in combination, a power plant, a clutch, a change speed transmission, a transverse drive shaft driven by said transmission and located longitudinally between said transmission and said clutch, a second transverse shaft below said first transverse shaft, driving connections between said second and first transverse shafts, a brake drum on said second transverse shaft, and a floating brake linkage detachably supported from above said drum, said linkage including a tension link adjustable to compensate for wear and extending across the bottom of said linkage.

7. In a device of the class described, in combination, spaced axles, a power plant, a transmission, a transverse drive shaft driven by said transmission, a second transverse drive shaft driven by said first transverse drive shaft and intermediate said axles, a brake drum on said second transverse drive shaft, and a pair of braking shoes pivoted for independent rotation on one side of said drum.

8. In a device of the class described, in combination, spaced axles, a jack shaft between said axles, driving means running from both axles to the central part of said jack shaft, a gear drive at one end of said jack shaft for transmitting power thereto, a brake drum at the opposite end of said jack shaft and a floating brake linkage detachably supported above said drum.

9. In a device of the class described, in combination, an axle bearing track wheels, a jack shaft spaced from said axle, a gear drive at one end of said jack shaft and a brake drum at the opposite end, a floating brake linkage detachably supported above said drum, and drive connections from said axle to the central part of said jack shaft.

In witness whereof, I hereunto subscribe my name this 21 day of July, 1924.

WM. A. BEIMLING.